March 18, 1930.  J. McNULTY  1,751,244
VALVE ACTUATING MECHANISM
Filed April 19, 1928   3 Sheets-Sheet 1

INVENTOR
Joseph McNulty
By W. W. Williamson
Atty.

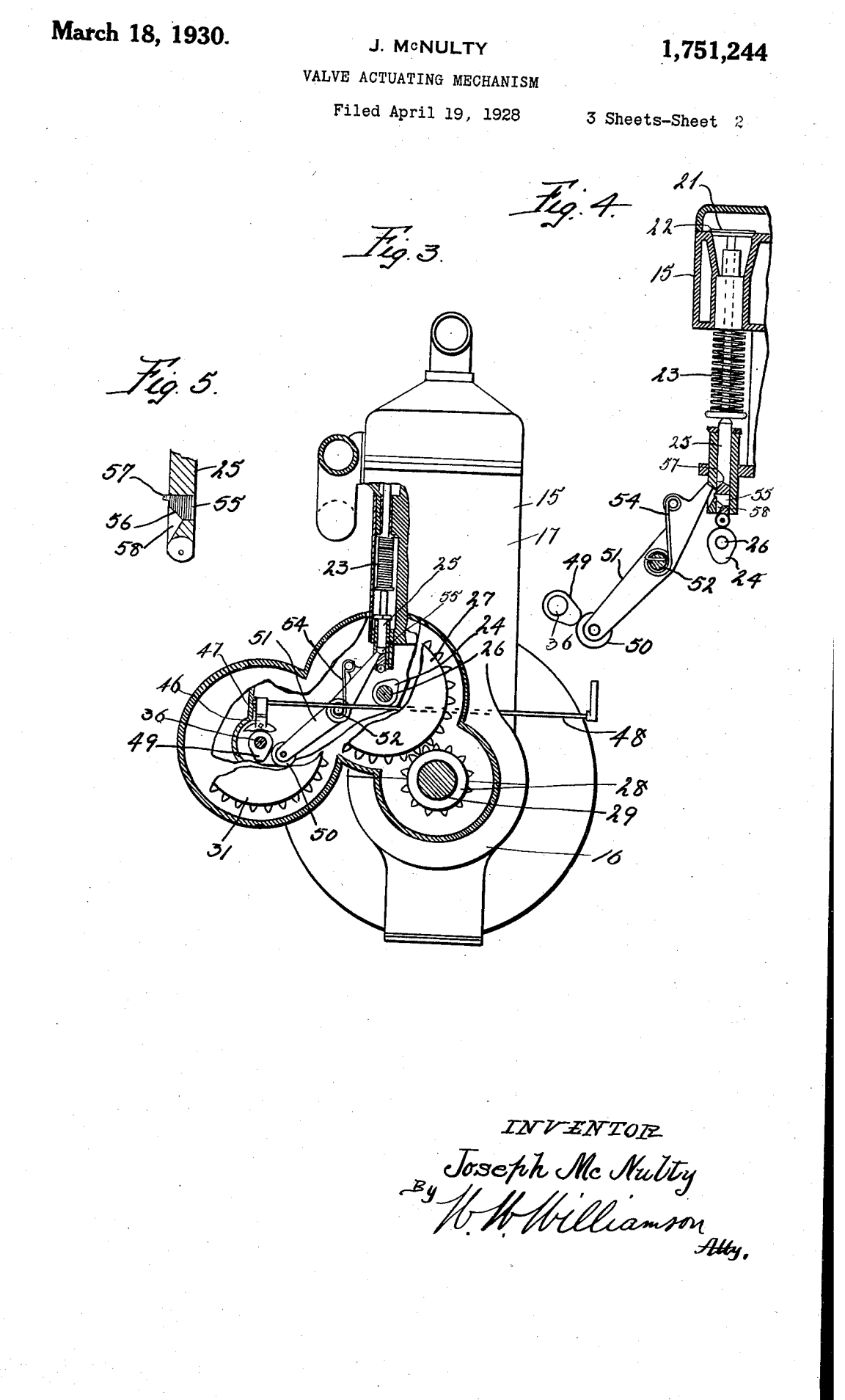

March 18, 1930.                J. McNULTY                1,751,244
                        VALVE ACTUATING MECHANISM
                          Filed April 19, 1928        3 Sheets-Sheet 2

INVENTOR.
Joseph McNulty
By W. W. Williamson
Atty.

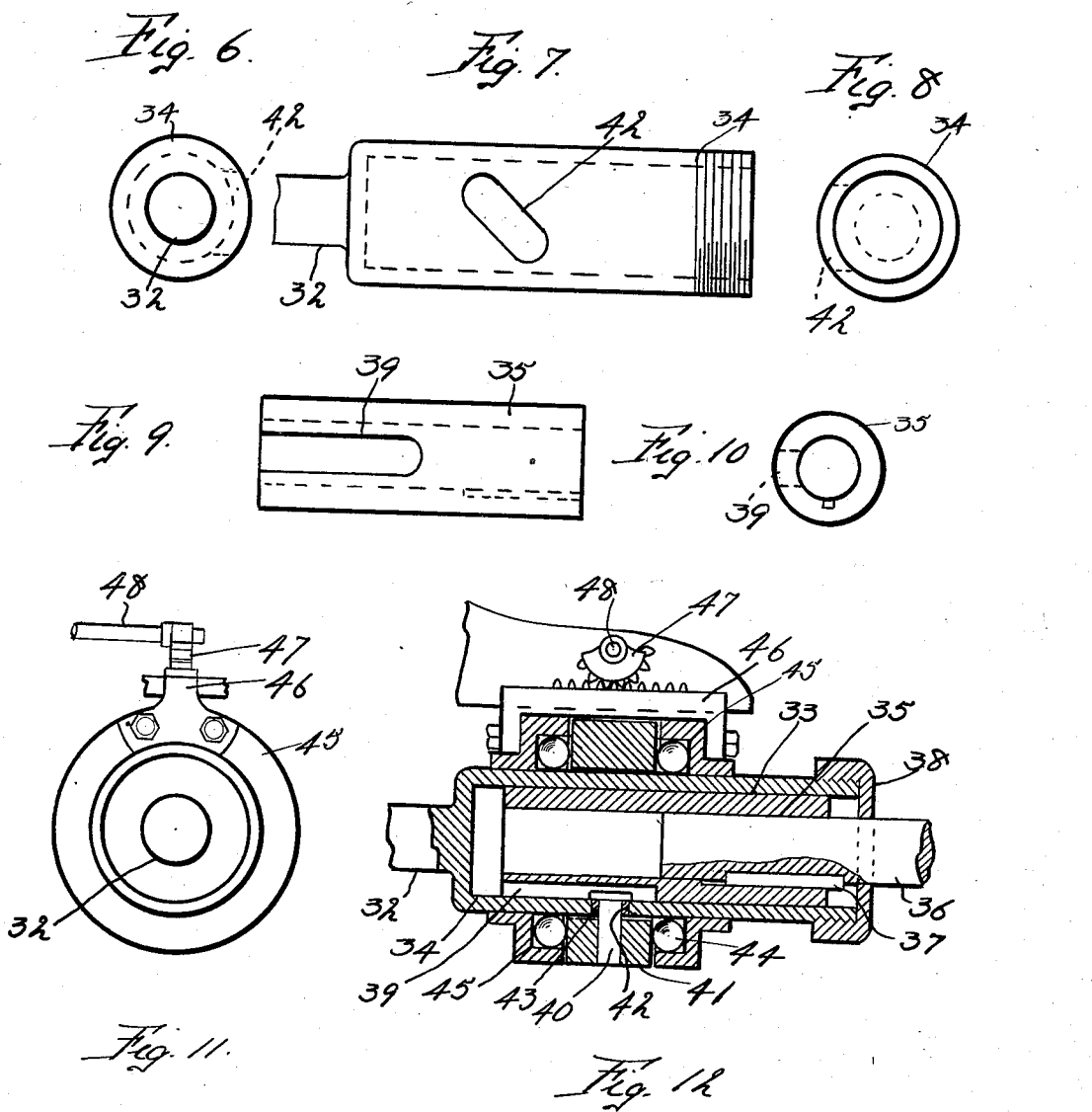

Patented Mar. 18, 1930

1,751,244

UNITED STATES PATENT OFFICE

JOSEPH McNULTY, OF PHILADELPHIA, PENNSYLVANIA

VALVE-ACTUATING MECHANISM

Application filed April 19, 1928. Serial No. 271,138.

My invention relates to new and useful improvements in valve actuating mechanism especially adapted to be used on multiple cylinder engines where an explosion is produced at every alternate revolution of the crank shaft, the object being to provide means for controlling the inlet valves whereby they can be retarded or held open a predetermined time on the compression strokes of the pistons, so that any desirable amount of a full charge of the explosive mixture drawn into a cylinder through its inlet valve on the rearward stroke of the piston, can be forced outwardly through the inlet valve and thus reduce the compression, thus saving a part of the charge and allowing the engine to be started with greater ease, and to run along at a moderate rate of speed with about one-third of the amount of explosive mixture, ordinarily used with engines of this character.

Another object of my invention is to so connect the inlet valve retarding mechanism with the cam shaft of the engine that it will work in unison with the opening and closing of the inlet valve.

Another object of my invention is to provide unique means for changing the positions of the cams for regulating the time for the release of the inlet valves.

Another object of my invention is to provide remote control means whereby the positions of said cams can be changed.

Another object of my invention is to provide a valve actuating mechanism which is exceedingly simple and cheap in construction and which, with relatively few changes, may be embodied as a part of an ordinary multiple cylinder engine.

A further object of my invention is to provide a valve actuating mechanism which is composed of a very few parts so arranged and connected with the cam shaft that it is almost impossible for the same to get out of order.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings, forming a part of this application, in which:—

Fig. 3, is an end view thereof partly in section and portions broken away showing the position of the secondary cam shaft controlling the levers which retard the closing of the inlet valves held in an open position.

Fig. 4, is an enlarged fragmentary end view partly in section of one of the inlet valves illustrating the position of the retarding lever and its cam when the inlet valves are closed.

Fig. 5, is a further enlarged sectional view of the lower end of the tappet showing the hard metal insert.

Fig. 6, is an outer end view of one element of the split secondary cam shaft.

Fig. 7, is a side elevation thereof.

Fig. 8, is an inner end view of the same.

Fig. 9, is a side elevation of the sleeves between the elements of the split secondary cam shaft.

Fig. 10, is an end view thereof.

Fig. 11, is an end view of the cam position changing means.

Fig. 12, is a longitudinal sectional view thereof with parts in elevation.

Figure 1:
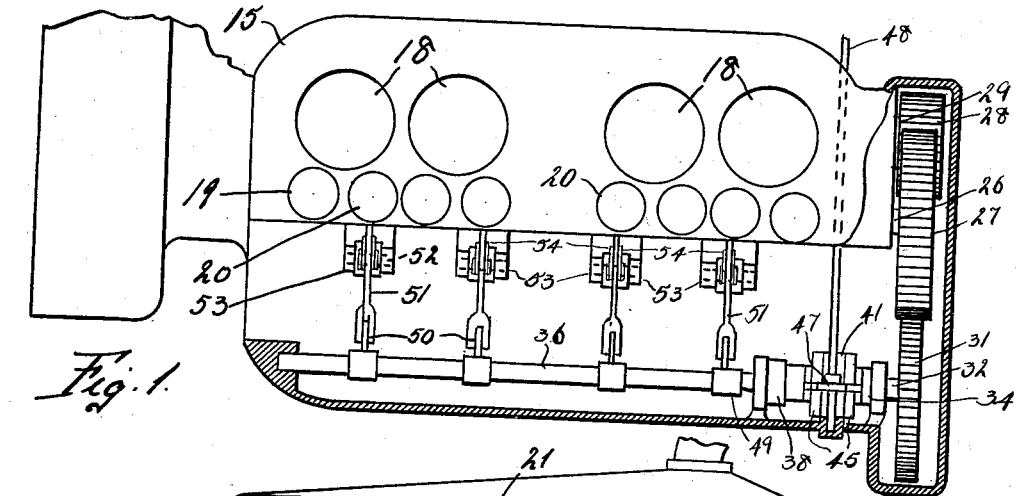
Fig. 1 is a plan view of an engine block with the head removed and parts in section showing my valve actuating mechanism applied thereto.
Figure 2:
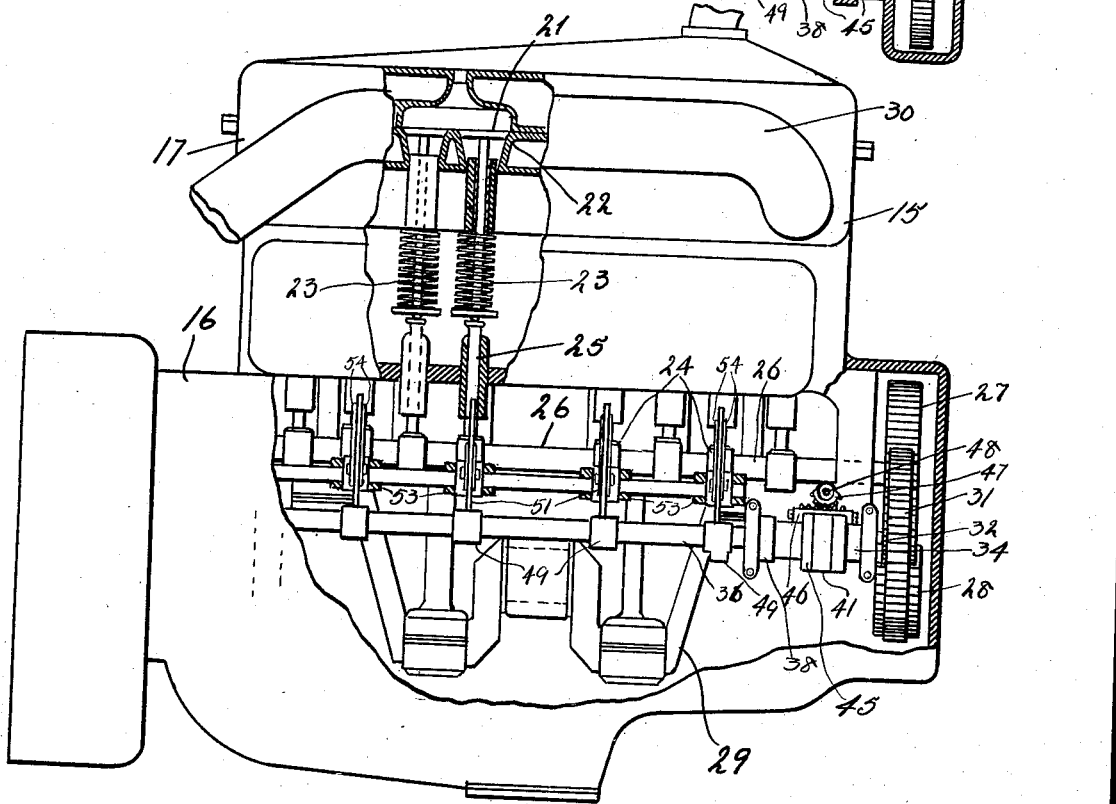
Fig. 2, is a side elevation of the engine with portions broken away and parts in section to illustrate details of construction and the location of parts of my invention.

In carrying out my invention as herein embodied, 15 represents a four-cycle engine including a crank case 16, a cylinder block 17 provided with the cylinders 18, the exhaust valve openings 19 and the intake valve openings 20.

In the intake valve openings or intake valve casings 20 are located the usual intake valves 21, each of which coacts with a seat 22 which it is ordinarily caused to engage by a spring 23 while being opened through the intermittent engagement of a cam 24 with an aligned tapet 25.

The cams for all of the valves are fixed on a cam shaft 26 carrying a cam shaft gear 27 meshing with the crank shaft gear 28 fixed to the crank shaft 29 to which are connected in the usual manner the pistons (not shown) and which on alternate inward or rearward strokes draw in a charge of the explosive mixture from the carburetor through a manifold 30.

As is usual, on one forward stroke of each piston, the charge will be compressed and ignited while on the next forward stroke of the piston, the exhaust valve will be open so as to force the burnt gases out through the same. It is, of course, understood that the cams on the cam shaft are so arranged that simultaneous charges will be taken into one cylinder, compressed in another, exploded in another, and so on in the ordinary manner of operation of engines of this character.

The gear 27 on the cam shaft meshes with a gear 31 on the outer section 32 of the split secondary cam shaft 33 and the opposite end of said section 32 is provided with a socket 34 in which is loosely mounted a sleeve 35 splined to the other section 36 of the split secondary cam shaft by means of the spline 37 and the usual grooves. The end of the socket 34 is closed by a cap 38 through which the shaft 36 projects.

The sleeve 35 is provided with a longitudinal groove 39 for the reception of the head of the pin 40 carried by the ring 41 and projecting through the diagonal slot 42 in the socket 34 and on that portion of the pin 40 passing through the slot is an antifriction roller 43 for coaction with the walls of said slot.

The ring 41 revolves with the split secondary cam shaft and is also movable longitudinally thereof for a purpose to be presently described, and said ring is mounted between suitable ball bearings 44 held by the carriers 45 on opposite sides of the ring which carriers may move longitudinally of the secondary cam shaft but do not revolve. Connected with both carriers is a suitable rack 46 with the teeth of which mesh a pinion 47 preferably of the segmental type and said pinion is carried by one end of a shaft 48 suitably journalled as in the walls of the crank case.

It will be seen that by rotating the shaft 48, motion will be transmitted therefrom through the segmental pinion 47, the rack 46, the ball bearing structure and the ring 41 to the pin 40 which will therefore be moved in the longitudinal groove 39 and also in the oblique slot 42, thus turning the section 36 of the secondary cam shaft relative to the section 32 thereof so as to change the position of the cams 49 carried on said section 36 whereby said cams can be brought into engagement sooner or later with the antifriction rollers 50 on the levers 51, one of which is associated with each inlet valve.

The levers 51 are suitably pivoted intermediate their ends as on pins 52 fixed in brackets 53 carried by a suitable portion of the engine structure and these levers are spring actuated in that direction which will normally hold the rollers in contact with the cams 49 by springs 54.

The nose of each lever 51 is adapted to coact with an inlet valve to normally hold it in an open position and in the present instance each lever is shown as coacting with the tappet of the respective inlet valve which such lever is to control, and I have found that by providing an insert 55 of relatively harder metal than the valve part or tappet 25, a very good and effective seat is provided for the nose of the lever. The insert 55 has a beveled or inclined edge 56 which forms the seat for the nose of the lever and above this is an overhanging lip 57 which arrests the downward or closing movement of the valve after being released by the lever. The inclined or beveled edge 56 of the insert is located at the upper end of the aperture 58 in the valve part or tappet 25 so that the nose of the lever projects into said aperture when in engagement with the seat 56.

When a lever is in engagement with the inlet valve, or more particularly the tappet thereof, said valve will be held open so as to allow the charge of explosive mixture taken in, to be partly forced out again before the inlet valve closes. Thus compression is reduced within the cylinder, saving a great amount of gas, which is now burnt when not required, especially when idling.

The operation of my improved valve controlling mechanism is as follows:—

The shaft 48, which is adapted to be connected to any suitable operating lever mounted within easy reach of the operator, is operated to move the ring 41 longitudinally of the secondary cam shaft and thereby adjust the cams 49 on the section 36 of said secondary cam shaft, in the desired position. It will be noted that as the cam shaft 26 is rotated, the secondary cam shaft 33 will also be rotated through the medium of the intermeshing gears 27 and 31 and move the cams 49 into engagement with the anti-friction rollers 50 of the levers 51 so that said levers at the proper time will engage their respective inlet valves and hold them in their open positions after the cams 24 on the primary cam shaft have released the valves, it, of course being understood that these two shafts are so timed and connected together that the cams 49 will ordinarily engage the friction roller of the levers just as the cams 24 are releasing the inlet valves.

During this retarded closing of the inlet valves, the pistons on their forward strokes will force the gas explosive mixtures out of the same and by adjusting the cams 49 on the secondary cam shaft, the valves can be held open until the pistons reach almost their full length of the stroke so that in reality there will be little compression which is of great advantage in starting an engine under some conditions, particularly when being manually cranked.

Since the explosive mixture is compressed in the several cylinders one after another, it follows that the explosive mixture which has been drawn into one cylinder as a part of it forces out and into the next cylinder in the order of operation and any additional mixture needed to fill the next cylinder is drawn from the carburetor.

Another advantage in addition to those already specified is that the mixture which is forced from one cylinder to another is partly heated which tends to increase the effectiveness thereof.

It will also be seen that by reducing the compression, the engine can be run along at a moderate rate of speed with but very little explosive mixture. This also reduces the vibration, thus the engine can be left running when the machine is not in motion without injuring the same, and at a very small cost.

The main advantage of this invention is that any desirable amount of explosive mixture may be compressed and varied according to the amount of power required so that if a steep hill is being ascended, the full charge of the explosive mixture may be compressed, but if traveling on a smooth level road, a relatively small amount of the charge is compressed, thus resulting in a considerable saving of gasoline.

Of course I do not wish to be limited to the exact details of construction as herein shown as these may be varied within the limits of the appended claims without departing from the spirit of my invention.

Having thus fully described my invention, what I claim as new and useful is:—

1. In combination with a gas engine provided with spring actuated inlet valves, a cam shaft and cams for opening said valves, of levers co-operating with the valves and adapted to temporarily hold them in open positions, a pair of shaft sections, one of which is axially adjustable relative to the other, one of said sections being geared to the cam shaft, and cams carried by the other shaft section for actuating the levers to release the valves.

2. In a gas engine provided with spring actuated valves, a cam shaft and cams thereon for operating said valves, a shaft section geared to the cam shaft and provided with a socket, having an oblique slot therethrough, another section registering with the socket, cams on the last mentioned section, levers coacting with the cams and associated with the valves to temporarily hold the latter open until actuated by the last mentioned cams, a ring surrounding the socket, and means carried by said ring projecting through the slot and engaging the shaft section carrying the cams and whereby the longitudinal movement of the ring will axially adjust the cam carrying section relative to the other section.

3. The structure set forth in claim 2 in combination with ball bearing structures located on opposite sides of the ring and coacting therewith, a rack secured to said ball bearing structures, a pinion meshing with the rack to move the same, and a shaft on which the pinion is mounted, said shaft being journalled in the engine structure.

4. In a gas engine provided with spring actuated valves, a cam shaft and cams for opening said valves, spring actuated levers to retard the closing of the valves, a shaft section provided with a socket geared to the cam shaft and having an oblique slot therethrough, a sleeve within the socket and provided with a longitudinal groove in its outer surface and located in the region of the slot, another shaft section splined in said sleeve, cams carried by said other section to engage the levers for actuating them for releasing the valves, a ring revolubly and slidably mounted on the socket, a pin carried by said ring projecting through the slot and into the groove, a roller on said pin within the slot, ball bearing structures on both sides of the ring and movable longitudinally of the socket, a rack mounted on the ball bearing structures, a pinion meshing with the rack, and rotatable shaft on which the pinion is mounted whereby the rotation thereof will cause the cam carrying shaft section to rotate relative to the other shaft section.

5. In a gas engine provided with spring actuated valves, tappets coacting with said valves, a cam shaft and cams thereon for opening the valves, inserts having beveled edges and lips above the beveled edges, said inserts being mounted in apertures in the tappets, spring actuated pivoted levers, the inner ends of which coact with the beveled edges of the inserts to hold the inlet valves in open positions, and means having a time factor relative to the cam shaft for operating the levers to first disengage them from the beveled edges of the insert and permit engagement thereof with the lips and finally disengaging them from said lips to permit complete closing of the valves.

6. The combination with a gas engine including an intake valve for each cylindner and valve operating mechanism, of means independent of the valve operating mechanism and coacting with each valve to prevent closing of the same and angularly adjustable means for disengaging the valve engaging means from said valve.

7. In valve actuating mechanism, the combination of a valve spring actuated for closing the same, a cam directly operating the valve to open the same, means independent of said cam and coacting directly with the valve to retard the closing thereof and another cam having an angular adjustment relative to the first mentioned cam and coacting with the valve retarding means to disengage it from the valve at a predetermined time.

8. In valve actuating mechanisms, the combination with an engine including intake valves, spring actuated in one direction, for closing the same, cams for opening said valves, means independent of said cams and coacting directly with the valves to retard the closing thereof, other means coacting with the retarding means whereby said inlet valves can be held open and means for adjusting said second named means to actuate the latter a predetermined time after the valve operating cams are operated.

9. In a gas engine including spring actuated inlet valves, a cam shaft, cams thereon coacting directly with the valves for opening them, means independent of the cams and coacting directly with the valves for retarding the closing thereof, a secondary shaft, means for transmitting motion from the first mentioned shaft to the secondary shaft, cams on said secondary shaft coacting with the retarding means to disengage the same from the valves, and means for providing an angular adjustment to the last mentioned cams whereby the retarding means will be operated at any predetermined time subsequent to the opening of the valves by the first mentioned cams.

10. In a multiple cylinder gasoline engine provided with intake and exhaust valves, means for regularly operating said exhaust valves, means for regularly opening said intake valves, spring actuated levers coacting with said intake valves to retard closing thereof a variable predetermined time during the suction and part of the compression stroke of the engine, and means coacting with said levers to disengage them from the intake valves at times determined by the operator to allow said valves to close so that compression can take place.

In testimony whereof, I have hereunto affixed my signature.

JOSEPH McNULTY.